(12) United States Patent
Patel (10) Patent No.: US 9,255,655 B2
(45) Date of Patent: Feb. 9, 2016

(54) FLUID COUPLING ASSEMBLY

(75) Inventor: Nilesh Patel, Irvine, CA (US)

(73) Assignee: SPS Technologies, LLC, Jenkintown, PA (US)

( * ) Notice: Subject to any disclaimer, the term of this patent is extended or adjusted under 35 U.S.C. 154(b) by 0 days.

(21) Appl. No.: 13/407,710

(22) Filed: Feb. 28, 2012

(65) Prior Publication Data

US 2013/0221658 A1    Aug. 29, 2013

(51) Int. Cl.
*F16L 19/00*    (2006.01)

(52) U.S. Cl.
CPC .................................... *F16L 19/005* (2013.01)

(58) Field of Classification Search
USPC ............ 285/305, 321, 387, 388, 92; 411/249, 411/329, 517, 518; 403/DIG. 45
See application file for complete search history.

(56) References Cited

U.S. PATENT DOCUMENTS

| 922,805 | A | * | 5/1909 | Nelson et al. | 285/238 |
|---|---|---|---|---|---|
| 1,254,375 | A | * | 1/1918 | Thompson | 285/90 |
| 1,289,867 | A | * | 12/1918 | Moore | 411/329 |
| 2,131,948 | A | * | 10/1938 | Graham | 411/518 |
| 2,194,973 | A | * | 3/1940 | Durant | 285/388 |
| 2,226,914 | A | * | 12/1940 | Sharon | 285/34 |
| 4,006,659 | A | * | 2/1977 | Wurzel et al. | 411/518 |
| 4,547,004 | A | * | 10/1985 | Goldberg | 285/31 |
| 5,284,582 | A | * | 2/1994 | Yang | 210/232 |
| 5,286,066 | A | * | 2/1994 | Yang | 285/23 |
| 5,356,183 | A | * | 10/1994 | Cole | 285/305 |
| 6,857,665 | B2 |  | 2/2005 | Vyse et al. |  |
| 7,156,424 | B2 | * | 1/2007 | McCord | 285/92 |
| 8,555,765 | B2 | * | 10/2013 | Graham et al. | 285/92 X |

* cited by examiner

*Primary Examiner* — Gregory Binda
(74) *Attorney, Agent, or Firm* — Brinks Gilson & Lione (57) ABSTRACT

A coupling for joining fluid conduits includes a nut portion having a circumferential groove that extends at least partially along an interior surface thereof. The nut portion further includes a tab opening extending therethrough. A cylindrical shaft portion extends from the nut portion. A retaining clip is disposed within the circumferential groove of the nut portion and includes a tab disposed within the tab opening. A first arc of the retaining clip extends from the tab in a first circumferential direction, and a second arc of the retaining clip extends from the tab in a second, opposing circumferential direction. The first arc includes a first knob and terminates in a second knob, and the second arc includes a third knob and terminates in a fourth knob. The second and fourth knobs are larger than the first and third knobs, respectively.

5 Claims, 7 Drawing Sheets

FLUID COUPLING ASSEMBLY

RELATED APPLICATIONS

Not Applicable.

BACKGROUND OF THE INVENTION

1. Field of the Invention

The present invention relates generally to a locking assembly for fastening two fluid-transmitting conduits, and more specifically to an improved, self-locking fluid coupling assembly that does not require utilization of a lock wire or other externally-applied devices or chemical compositions.

2. Background

Fluid-transmitting conduits are used for a variety of purposes in the art. Adjacent conduits are coupled mechanically to allow fluid to flow through both conduits. This coupling is typically accomplished by utilizing a threaded coupling, with each respective end of a conduit is attached to a component of the threaded coupling. The seals of the coupling apparatus are preloaded by making up the threaded connection between the components of the coupling. It is well known in the art that stress, vibration, movement, flexing, and other cyclical or dynamic forces can cause a loosening of a coupled connection, resulting in the release of a desired sealing torque in the connection. This release of torque can result in leaks, a drop in pressure, and other undesirable effects.

Loosening of a fluid-transmitting connection can be a particular problem for pneumatic and hydraulic connectors. These connectors are subject not only to the external forces and stresses identified above, but are also subjected to internal pressure stresses from the fluid being conducted through the coupling. Numerous approaches to addressing these problems exist in the art, including the use of adhesive materials and lock wires to prevent loosening of the coupling. In the aircraft industry, for example, many fluid coupling joints have included compression fittings secured with threaded connections, where a nut is lock-wired to a mating connecting component such that the nut cannot turn with respect to the fitting. This ensures against loss of fluid tightness in the fitting joint. Fluid coupling joints are, however, often assembled in areas where a worker's vision is obscured and the joint assembly occurs outside of the direct vision of the worker. In such cases, use of a lock wire is unsatisfactory. Further, the ability to inspect the assembled joint in order to ascertain the integrity of the joint is also compromised. Thus, lock wires are not suitable means of ensuring a proper connection in all cases. Further, the use of lock wires is a time-consuming process. Typically, a worker has to drill a hole in one or more corners of the nut and secure the wire to a boss or other tie-down structure in order to secure the tie wire. The lock-wired connection can also cause damage to equipment and injury to workers and other personnel because of the twisted wires, which can easily snag on clothing, equipment, or skin.

Other attempts have been made to secure such couplings without the use of lock wires. Many such means of securing the coupling require multiple parts, or complicated parts, to achieve the proper locking of the connection. Some require a lock between the connector and the B-nut (the nut typically used in hydraulic and pneumatic applications), and the connector length is often increased to incorporate the locking features. The increased length of the connector results in an increased weight of the connector, and both the increased weight and length can be problematic in installation, where space is limited. In addition, some of these lockwireless couplings require a specific type or ferrule to be used with the coupling for the locking mechanism to engage.

SUMMARY OF THE INVENTION

One aspect of the present invention provides a coupling for joining fluid conduits. The coupling includes a nut portion having a circumferential groove that extends at least partially along an interior surface thereof. The coupling further includes a tab opening extending through a surface of the nut portion for receiving the tab of a retaining clip. A cylindrical shaft portion extends from the nut portion. The retaining clip is disposed within the circumferential groove and includes a tab disposed within the tab opening of the nut portion of the coupling. A first arc of the retaining clip extends from the tab in a first circumferential direction, and a second arc of the retaining clip extends from the tab in a second, opposing circumferential direction. The first arc includes a first knob and terminates in a second knob, and the second arc includes a third knob and terminates in a fourth knob. The second and fourth knobs are larger than the first and third knobs, respectively.

In another aspect of the invention, the coupling includes a plurality of threads along at least a portion of an interior surface thereof.

In another aspect of the invention, the cylindrical shaft portion includes a plurality of threads extending along at least a portion of an interior surface thereof.

Another aspect of the present invention provides a fluid coupling assembly. The fluid coupling assembly includes a connector attached thereto. The connector has a first seal face and a plurality of external threads on an exterior surface thereof. It is to be noted that the present invention is adaptable for a variety of different connectors, thereby increasing its application. The fluid coupling assembly further includes a ferrule having a plurality of depressions on the exterior surface thereof. Also provided is a coupling that includes a nut portion having a plurality of threads extending along a portion of the interior surface thereof, a circumferential groove extending along the circumference of the interior wall, and a tab opening extending through a surface of the nut portion. The fluid coupling also includes a cylindrical shaft portion extending away from the nut, the cylindrical shaft having threads extending along at least a portion of an interior wall thereof. A retaining clip as described above is disposed within the circumferential groove of the nut portion. When the cylindrical shaft portion is fully made up with the connector, a seal face of the connector and a seal face of the ferrule are in sealing engagement and the knobs on the retaining clip are at least partially disposed within the depressions of the ferrule, thereby preventing rotational movement of the coupling.

DETAILED DESCRIPTION OF THE INVENTION

The description herein is provided to enable any person skilled in the art to make and use the present invention. The embodiments of the present invention described and shown are exemplary, and it is contemplated that various modifications to what is described and shown will be readily apparent to those of ordinary skill in the art upon reading this disclosure. Such modifications are contemplated to be within the spirit and scope of the present invention.

Figure 1:
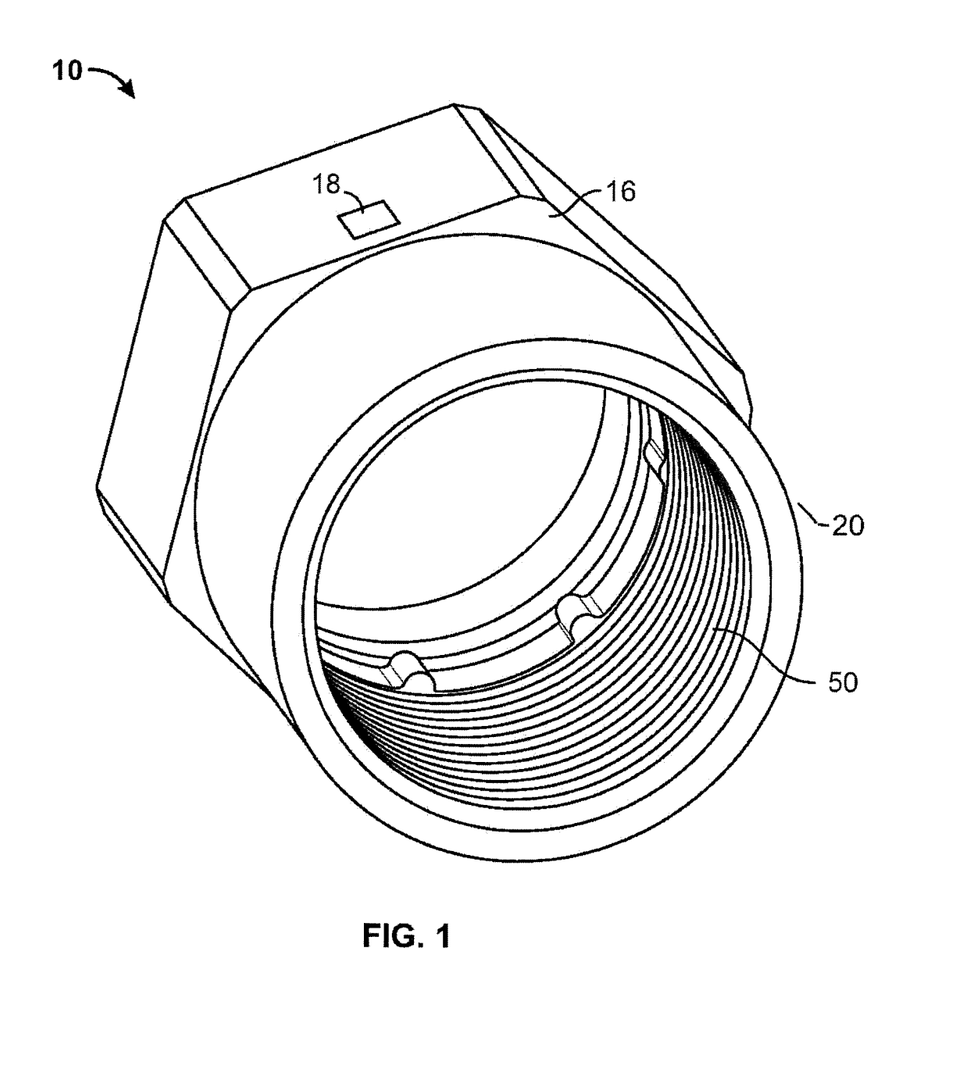
FIG. 1 is a perspective view of one embodiment of a fluid coupling of the present invention.
Figure 3:
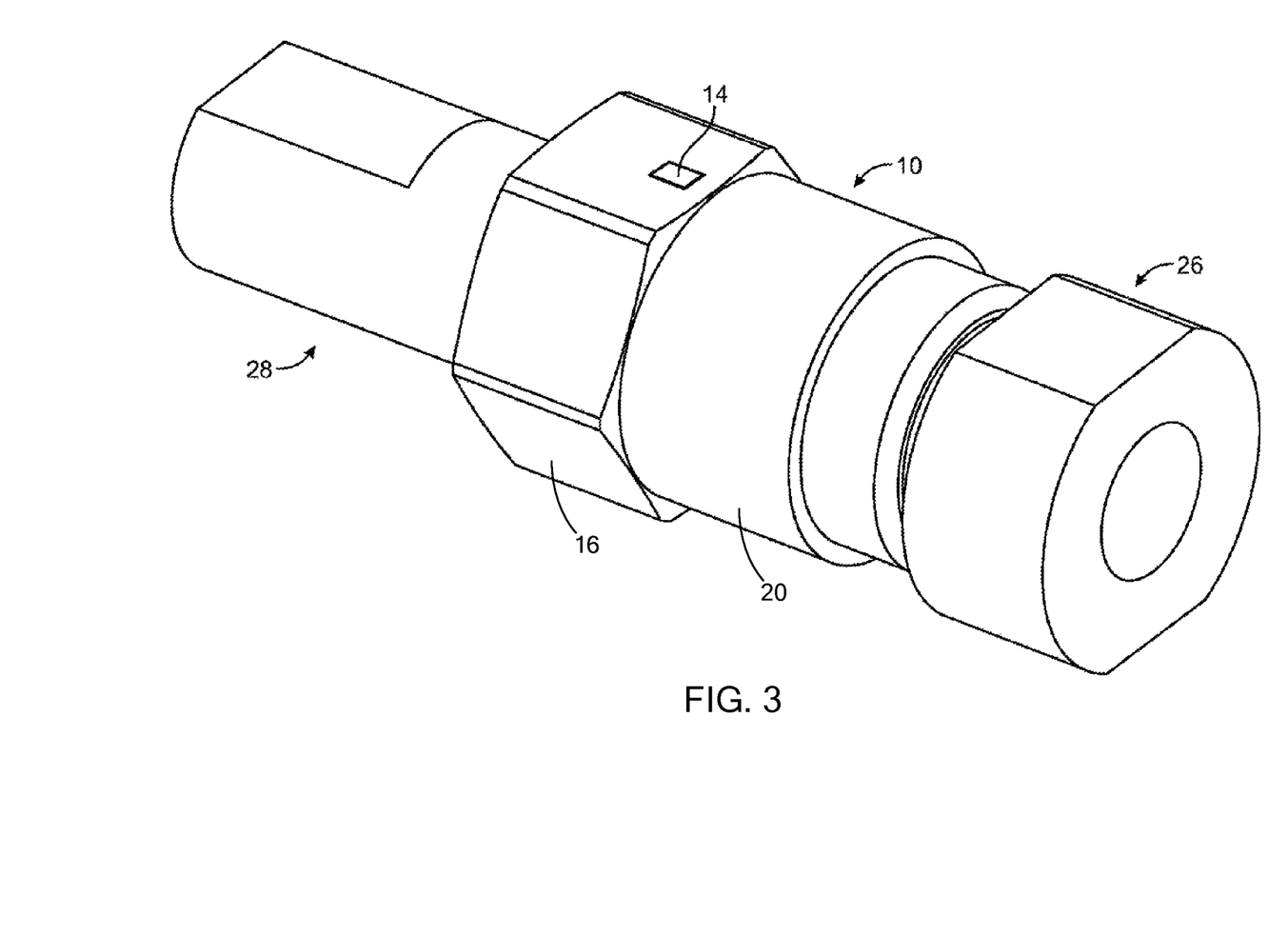
FIG. 3 is a perspective view of a fluid coupling assembly comprising one embodiment of a fluid coupling of the present invention.

Turning now to the drawings, wherein like numerals indicate like parts, FIG. 1 is a perspective view of a fluid coupling 10 utilizing a lockwireless fitting of the present invention. Fluid coupling 10 is adapted to receive a connector 26 and a fluid conduit 28 (best shown in FIG. 3). The fluid coupling 10 includes a nut 16 portion into which fluid conduit 28 is received, and a cylindrical shaft 20 portion into which connector 26 is received. Nut portion 16 preferably includes a plurality of flat edges for engaging nut portion 16 with a wrench or other device such that the fluid coupling 10 can be tightened. The fluid coupling 10 is adapted to lock, thereby preventing loosening of the connection between connector 26 and fluid conduit 28.

Figure 4:
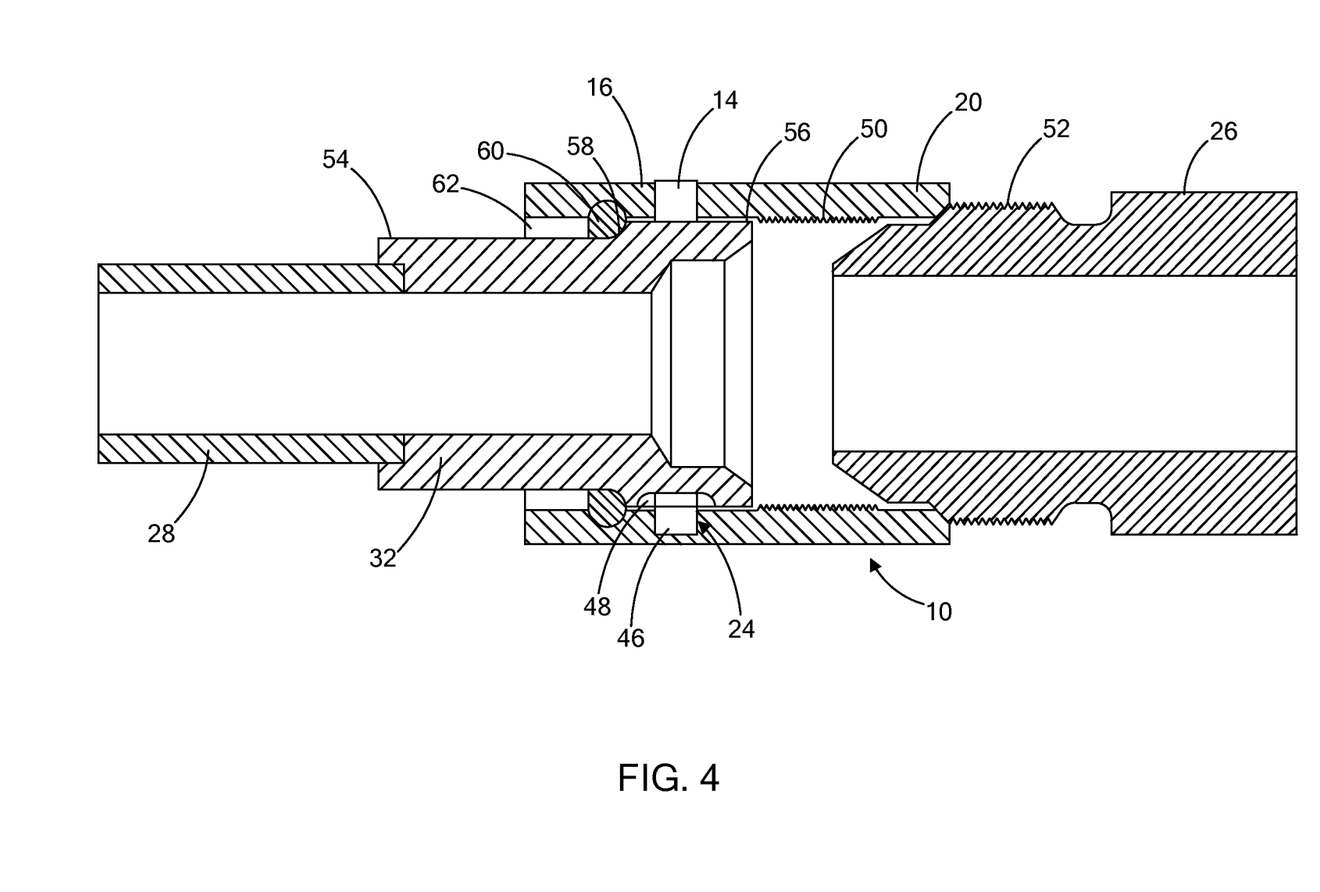
FIG. 4 is a cross-sectional view of a fluid coupling assembly comprising one embodiment of a fluid coupling of the present invention.

Referring to FIG. 4, fluid conduit 28 is preferably attached to a ferrule 32. This attachment is achieved by means known in the art, such as by welding, dynamic seal beam, flaring, flareless connection, crimping, swaging, lock ring, or other means known to those skilled in the art, which may utilize counter bores, shoulders, or other internal structures within ferrule 32.

Connector 26 is connected by fluid coupling 10 to fluid conduit 28. In one embodiment of the invention, connector 26 is attached to a ferrule 32 that extends through cylindrical shaft 20 portion and into nut 16 portion of the fluid coupling 10. Ferrule 32 is best shown in the cross-sectional representation of the fluid coupling assembly shown in FIG. 4. The attachment means utilized for attaching ferrule 32 to connector 26 should not allow rotation of ferrule 32 with respect to connector 26. Fluid coupling 10 must be configured such that when a coupling is made to join two fluid conduits together, a leak-tight seal is created between the ferrule 32 and the connector 26. This type of seal, comprising a frusto-conical section in one seal face and a matching surface on the opposing seal face is a dynamic seal wherein increased pressure of the fluid within the passageway works to increase the sealing force between the seal faces.

Ferrule 32 may be generally cylindrical, having an opening extending through its entire length, where the opening is oriented along the longitudinal axis of ferrule 32. Ferrule 32 is adapted at one end to receive and non-rotationally attach to connector 26. Fluid coupling 10 preferably comprises rotational locking means (described more fully, below) for preventing the rotation of fluid coupling 10 once fluid coupling 10 is made up and a leak-tight seal is created between ferrule 32 and connector 26. Cylindrical shaft 20 portion of fluid coupling 10 makes up with connector 26 such that when torque is applied to fluid coupling 10, the threads 50 of cylindrical shaft 20 portion advance cylindrical shaft 20 portion over connector 26. Fluid coupling 10 thus comprises fastening means such as internal threads 50 that are adapted to engage the fastening means of connector 26, such as external threads 52, and make up the connection. When fluid coupling 10 is made up with the connector 26, the seal face of ferrule 32 is brought into sealing engagement with the seal face of connector 26 to prevent leakage across the seal.

As shown in FIG. 4, when fluid coupling 10 is made up with connector 26, an end of connector 26 is internally received by fluid coupling 10. The fluid coupling 10 includes engagement portions, which are described in greater detail below, disposed circumferentially around at least a portion thereof. The nut 16 portion is also provided with a circumferential groove 24 formed therein, for receiving an annular clip 12, which may insertably mounted or otherwise retained in circumferential groove 24.

Figure 2:
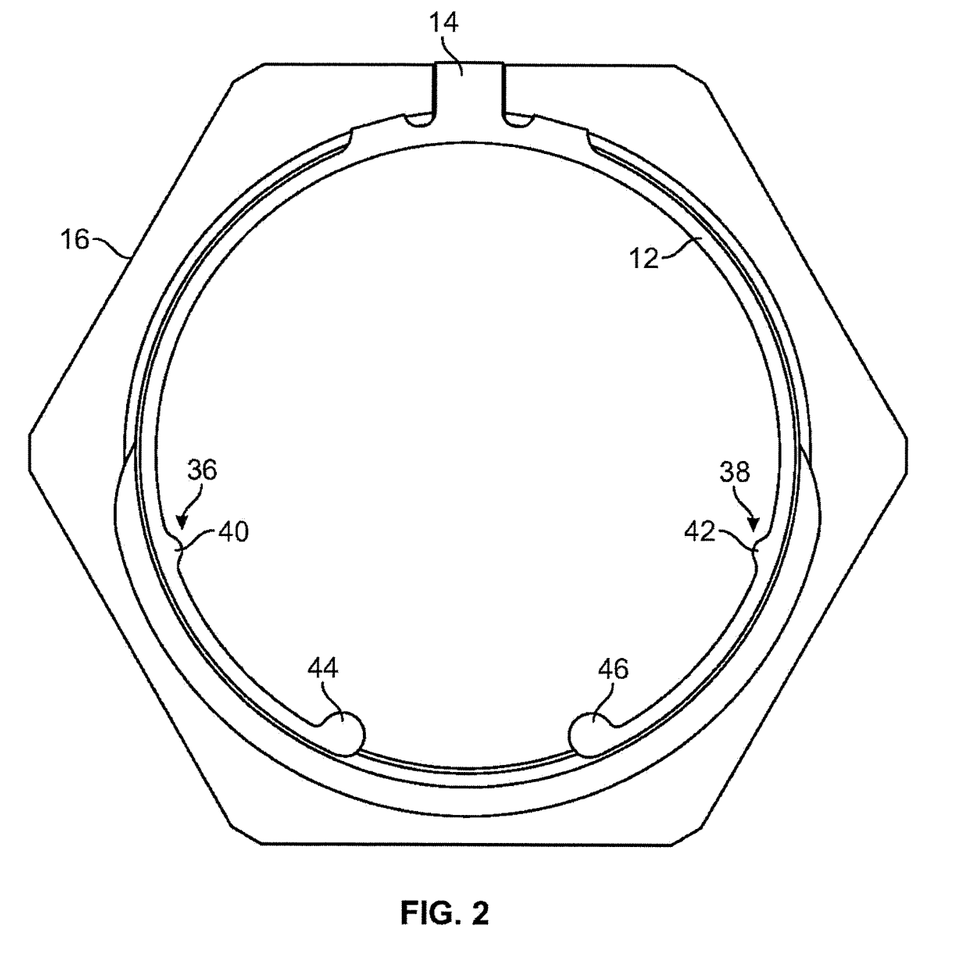
FIG. 2 is an elevation view of one embodiment of a fluid coupling of the present invention.

Referring to FIG. 2, annular clip 12 may be shaped from a length of flat, round, or other profile metal or other wire strip to form a resilient open ring. Clip 12 may be formed of a metal or metal alloy, such as stainless steel, steel, brass, aluminum, or the like. Other materials such as ceramics or synthetic polymers may also be used. Clip 12 includes a tab 14 sized and shaped to be received into an opening 18 in nut 16. Clip 12 further includes a first arc 36 extending in a first circumferential direction from tab 14 and a second arc 38 extending in a second, opposing circumferential direction from tab 14. First arc 36 and second arc 38 are sized and shaped to be received into circumferential groove 24 in the interior surface of fluid coupling 10. First arc 36 and second arc 38 of clip 12 each define a plurality of knobs separated by a length of the respective arc. In the embodiment of fluid coupling 10 shown in the drawings, first arc 36 defines a first minor knob 40 at a first position and terminates in a first major knob 44 at a second position of first arc 36. Likewise, second arc 38 defines a second minor knob 42 at a first position and terminates in a second major knob 46 at a second position of second arc 38.

Ferrule 32 of the present invention may include a plurality of recesses 48 in an exterior surface thereof, the recesses sized, shaped, and spaced so as to receive first minor knob 40 and first major knob 44 of first arc 36 and second minor knob 42 and second major knob 46 of second arc 38. When nut 16 portion of fluid coupling 10 is made up with connector 26 so as to bring connector 26 and a ferrule 32 into sealing engagement, first and second minor knobs 40 and 42, and first and second major knobs 44 and 46 of clip 12 are received into the recesses in ferrule 32. Once received into the respective recesses, the major and minor knobs of clip 12 prevent reverse rotation of fluid coupling 10. Ferrule 32 comprises a forward end 54 and a distal end 56. The ferrule 32 has a circumferential shoulder 58 axially disposed between the plurality of recesses 48 and the forward end 54. The nut portion 16 comprises a stop ring 60 circumferentially disposed against inner surface thereof, such that the circumferential shoulder 58 of the ferrule 32 abuts the stop ring 60 when the connector 26 is slidingly inserted within the fluid coupling 10.

Figure 5:
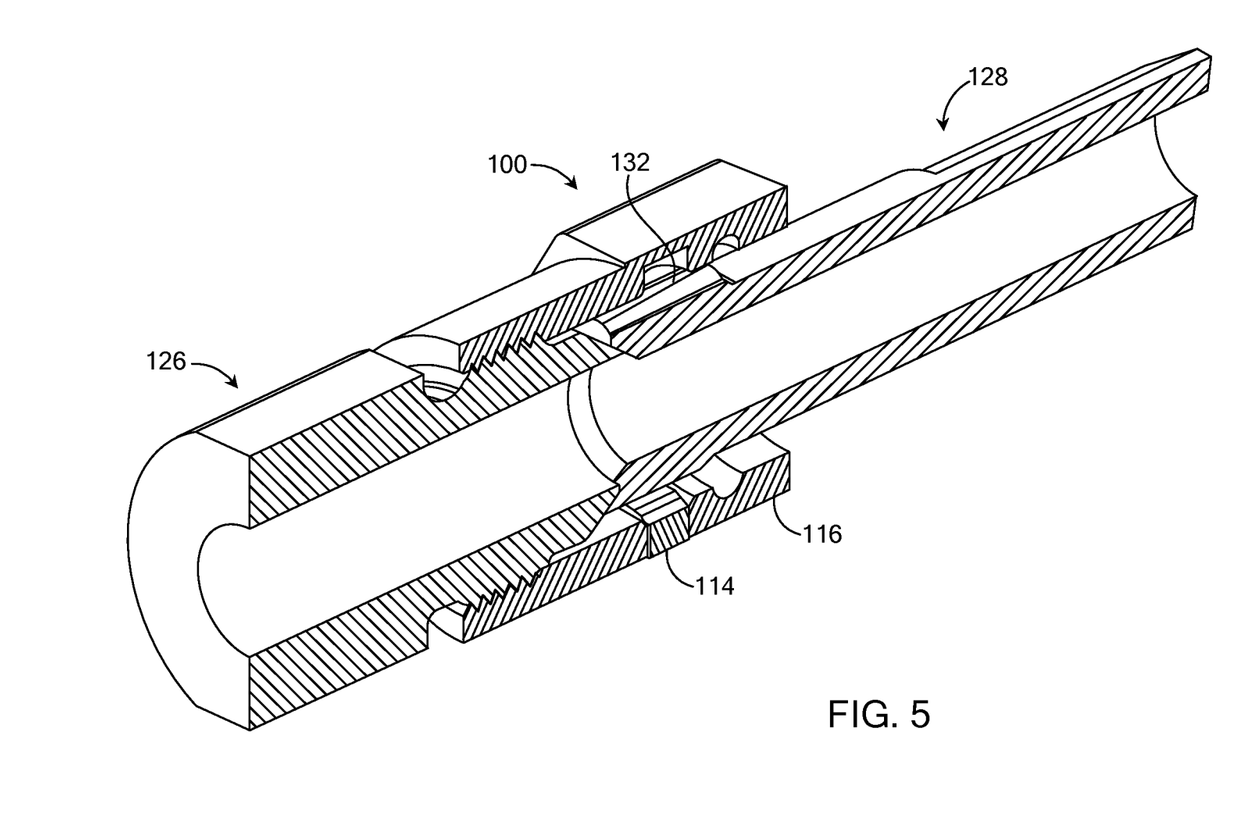
FIG. 5 is a perspective and sectioned view of a connector having a different embodiment of a ferrule which may be utilized in embodiments of the present invention.
Figure 6:
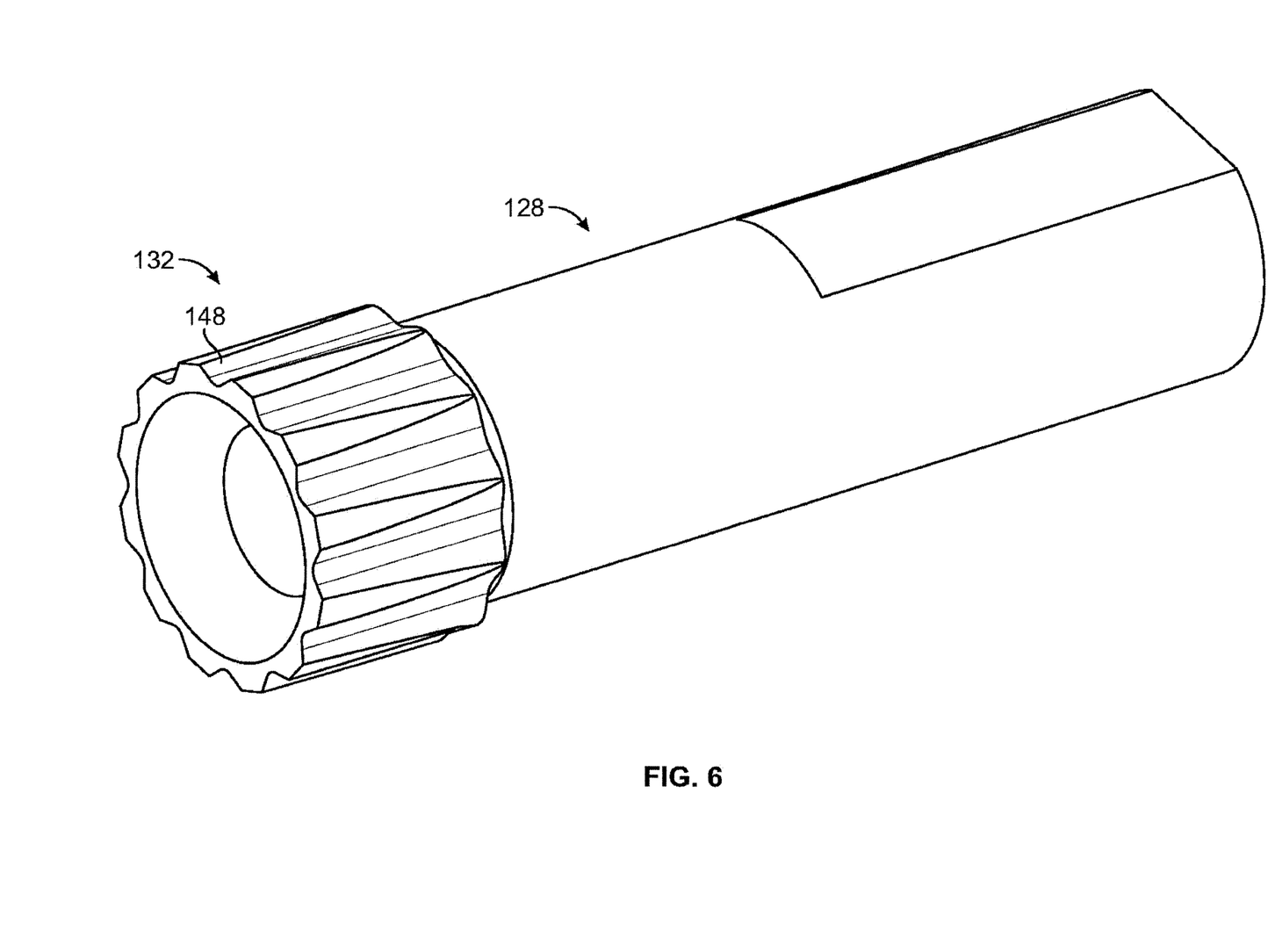
FIG. 6 is a sectional view of a fluid coupling assembly utilizing the ferrule shown in FIG. 5.
Figure 7:
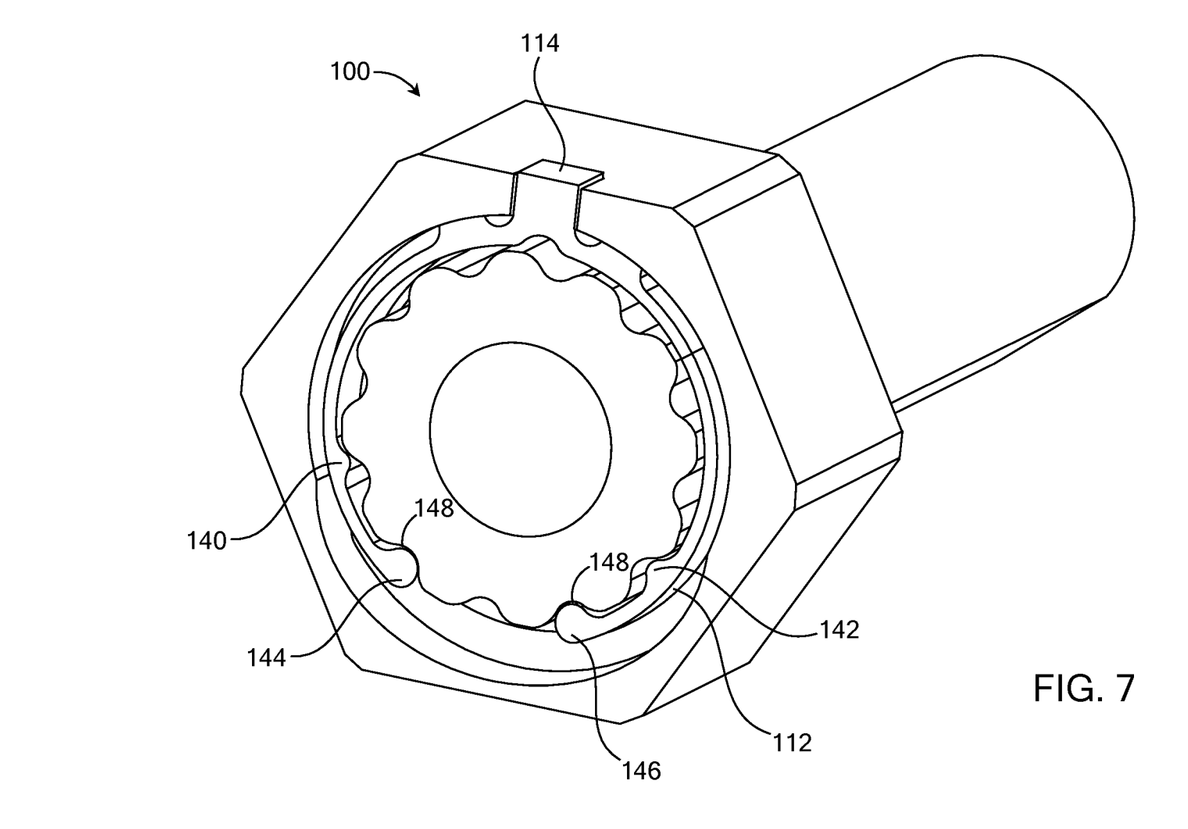
FIG. 7 is a sectional view showing how the pockets of the ferrule of FIG. 5 engage embodiments of the present invention.

FIGS. 5 through 7 show an embodiment of the presently disclosed fluid coupling may be utilized with a different type of ferrule 132. FIG. 5 shows a sectional view of fluid coupling 100 adapted to receive a connector 126 and a fluid conduit 128. The fluid coupling 100 includes a nut portion 116 into which fluid conduit 128 is received, and a cylindrical shaft portion into which connector 126 is received. Nut portion 116 preferably includes a plurality of flat edges for engaging nut portion 116 with a wrench or other device such that fluid coupling 100 can be tightened. Fluid coupling 100 is adapted to lock, thereby preventing loosening of the connection between connector 126 and fluid conduit 128. A clip 112 having a tab 114 is disposed within the nut portion 116.

FIG. 6 shows fluid conduit 128 comprising a ferrule 132 having a plurality of generally axially aligned pockets 148. As shown in FIG. 7, the pockets 148 may be engaged by first and second minor knobs 140 and 142, and first and second major knobs 144 and 146 of clip 112.

The invention claimed is:

1. A coupling for joining fluid conduits, the coupling comprising:
   a nut portion comprising an exterior surface, an interior surface, and a circumferential groove extending at least partially along a circumference of the interior surface of said nut portion, and further comprising a tab opening extending from the interior surface at the circumferential groove through to the exterior surface of the nut portion;
   a cylindrical shaft portion axially extending from said nut portion; and
   a resilient retaining clip disposed within said circumferential groove, the resilient retaining clip comprising a tab disposed within said tab opening, and further comprising a first arcuate member extending in a first circumferential direction from said tab and a second arcuate member extending in a second circumferential direction from said tab, the second circumferential direction opposite the first circumferential direction, the first arcuate member defining two knobs, the two knobs consisting of a first knob and a second knob, the second knob being larger than the first knob and the first arc terminating in the second knob, and the second arcuate member defining two knobs, the two knobs consisting of a third knob and a fourth knob, the fourth knob being larger than the third knob, and the second arcuate member terminating in the fourth knob, wherein each of the knobs define rounded edges that extend inwardly to engage an adjacent connector.

2. The coupling of claim 1 wherein the cylindrical shaft portion comprises a plurality of threads along at least a portion of an interior surface thereof.

3. A coupling for joining conduits, the coupling comprising:
   a nut portion comprising an exterior surface, an interior surface, and a circumferential groove extending at least partially along a circumference of the interior surface of said nut portion, and further comprising a tab opening extending through from the circumferential groove to the exterior surface of the nut portion;
   a cylindrical shaft portion axially extending from said nut portion;
   a generally circular shaped resilient retaining clip disposed within said circumferential groove, the circular resilient retaining clip comprising an outwardly facing surface and an inwardly facing surface, wherein the outwardly facing surface comprises a tab which extends outwardly from said outwardly facing surface into said tab opening, and the inwardly facing surface comprises a plurality of inwardly extending members which extend inwardly from said inwardly facing surface, the inwardly extending members including four knobs:
      a first knob and a second knob, the second knob being larger than the first knob and a first arc of the circular shaped resilient retaining clip terminating in the second knob; and
      a third knob and a fourth knob, the third knob being larger than the fourth knob and a second arc of the circular shaped resilient retaining clip terminating in the fourth knob, wherein each of the knobs define rounded edges;
   a ferrule received within the nut portion and the cylindrical shaft portion, the ferrule comprising an exterior surface, the exterior surface comprising a plurality of recesses therein;
   wherein when the ferrule is received within the nut portion and the cylindrical shaft portion, the rounded edges of the knobs engage the recesses in the exterior surface of the ferrule.

4. The coupling of claim 3 wherein the connector comprises a circumferential shoulder axially disposed between the plurality of recesses and the forward end.

5. The coupling of claim 4 further comprising a stop ring circumferentially disposed against the interior surface of the nut, wherein the circumferential shoulder of the connector abuts the stop ring when the connector is slidingly inserted within the nut.

* * * * *